United States Patent
He et al.

(10) Patent No.: US 12,402,159 B2
(45) Date of Patent: Aug. 26, 2025

(54) ENHANCED PHYSICAL UPLINK SHARED CHANNEL TRANSMISSION IN WIRELESS COMMUNICATIONS

(71) Applicant: Apple Inc., Cupertino, CA (US)

(72) Inventors: Hong He, Cupertino, CA (US); Dawei Zhang, Saratoga, CA (US); Wei Zeng, San Diego, CA (US); Haitong Sun, Irvine, CA (US); Chunhai Yao, Beijing (CN); Yushu Zhang, Beijing (CN); Chunxuan Ye, San Diego, CA (US); Seyed Ali Akbar Fakoorian, San Diego, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 491 days.

(21) Appl. No.: 17/442,196

(22) PCT Filed: Jan. 13, 2021

(86) PCT No.: PCT/CN2021/071417
§ 371 (c)(1),
(2) Date: Sep. 23, 2021

(87) PCT Pub. No.: WO2022/151018
PCT Pub. Date: Jul. 21, 2022

(65) Prior Publication Data
US 2022/0279523 A1    Sep. 1, 2022

(51) Int. Cl.
*H04W 72/56*    (2023.01)
*H04L 1/1829*    (2023.01)
(Continued)

(52) U.S. Cl.
CPC ........... *H04W 72/56* (2023.01); *H04L 5/0012* (2013.01); *H04L 5/0082* (2013.01); *H04W 72/0473* (2013.01); *H04W 72/23* (2023.01)

(58) Field of Classification Search
CPC . H04W 72/56; H04W 72/0473; H04W 72/23; H04L 5/0012; H04L 5/0082; H04L 1/1887; H04L 1/1864
See application file for complete search history.

(56) References Cited

U.S. PATENT DOCUMENTS

| | | | |
|---|---|---|---|
| 8,483,110 B2 | 7/2013 | Gao | |
| 8,982,755 B1 | 3/2015 | Shah et al. | |

(Continued)

FOREIGN PATENT DOCUMENTS

| | | |
|---|---|---|
| CN | 101651528 A | 2/2010 |
| CN | 109565794 A | 4/2019 |
| WO | 2018141213 A1 | 8/2018 |

OTHER PUBLICATIONS

International Search Report for PCT/CN2021/071417; Sep. 27, 2021.

*Primary Examiner* — Harry H Kim
(74) *Attorney, Agent, or Firm* — Kowert, Hood, Munyon, Rankin & Goetzel, P.C.

(57) ABSTRACT

Uplink transmissions of a mobile device (UE) may be improved in a number of ways. Uplink Transmission Time Interval (TTI) bundling, including both Type-A and Type B PUSCH repetitions, may be implemented with variable TTI bundle sizing. The TTI bundle size may be determined by a base station and communicated to the UE explicitly, or may be determined by the UE implicitly, based on an indicated repetition number and frequency hopping number. The UE may also report frequency hopping (FH) assist information to the base station for use by the base station to more efficiently configure FH for the uplink transmissions. Finally, the UE may use (or maintain) the same transmission power, for each TTI transmit occasion of the same TTI bundle in order to improve (cross-slot) channel estimation accuracy. Power allocation may be prioritized to ensure that (Continued)

at the same time a total power for the uplink transmissions of the UE does not exceed a specified threshold.

13 Claims, 11 Drawing Sheets

(51) Int. Cl.
*H04L 1/1867* (2023.01)
*H04L 5/00* (2006.01)
*H04W 72/044* (2023.01)
*H04W 72/23* (2023.01)

(56) References Cited

U.S. PATENT DOCUMENTS

| | | | |
|---|---|---|---|
| 10,812,247 B2 | 10/2020 | Wang | |
| 2013/0250924 A1* | 9/2013 | Chen | H04L 1/1893 370/336 |
| 2015/0036618 A1* | 2/2015 | Xu | H04L 5/0053 370/329 |
| 2016/0050658 A1* | 2/2016 | Tabet | H04L 5/0092 370/329 |
| 2019/0075589 A1* | 3/2019 | Jeon | H04W 72/20 |
| 2019/0223186 A1* | 7/2019 | Liu | H04L 5/0092 |
| 2020/0252917 A1* | 8/2020 | Zhang | H04W 76/27 |
| 2021/0409169 A1* | 12/2021 | Yang | H04L 5/0055 |
| 2023/0223985 A1* | 7/2023 | Rastegardoost | H04W 72/23 375/132 |

* cited by examiner

ENHANCED PHYSICAL UPLINK SHARED CHANNEL TRANSMISSION IN WIRELESS COMMUNICATIONS

PRIORITY CLAIM INFORMATION

This application is a national stage application of International Application No. PCT/CN2021/071417, filed on Jan. 13, 2021, titled "Enhanced Physical Uplink Shared Channel Transmission in Wireless Communications", which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless communications, including enhanced uplink communications, e.g. physical uplink shared channel (PUSCH) transmissions in wireless communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), BLUETOOTH™, etc. A next telecommunications standard moving beyond the current International Mobile Telecommunications-Advanced (IMT-Advanced) Standards is called 5th generation mobile networks or 5th generation wireless systems, referred to as 3GPP NR (otherwise known as 5G-NR or NR-5G for 5G New Radio, also simply referred to as NR). NR proposes a higher capacity for a higher density of mobile broadband users, also supporting device-to-device, ultra-reliable, and massive machine communications, as well as lower latency and lower battery consumption, than LTE standards.

One aspect of cellular communication systems involves transmission from mobile devices, generally referred to as uplink communications, for example in reference to mobile devices communicating with base stations in cellular networks. Uplink data is typically transmitted over a physical uplink shared channel (PUSCH). Improvements in the field are desired.

SUMMARY OF THE INVENTION

Aspects are presented herein of, inter alia, of methods and procedures for various devices, e.g. wireless communication devices, to operate with enhanced uplink communications, e.g. with enhanced Physical Uplink Shared Channel (PUSCH) transmission. Embodiments are further presented herein for wireless communication systems containing wireless communication devices, also referred to as user equipment (UE), and/or base stations and access points (APs) communicating with each other within the wireless communication systems. Uplink communications, including enhanced PUSCH transmissions, may be improved in a variety of ways.

According to one aspect, uplink Transmission Time Interval (TTI) bundling, also interchangeably referred to as TTI bundle, including both Type-A and Type B PUSCH repetitions, may be implemented in ways that improve uplink coverage performance. A TTI bundle size or granularity for uplink TTI bundles may be configured for improved uplink communications. In some embodiments, the TTI bundle size may be determined by a base station and communicated to the UE. The base station may determine the granularity/ based on reporting from the UE. In some embodiments, the TTI bundle size may be configured by higher layers, e.g. via higher layer signaling to the UE, based on buffers status report (BSR) and/or channel state information (CSI) reporting from the UE. In some embodiments, a set of bundling sizes may be configured by the base station, with selection of an active bundling size by the UE enabled via a media access control (MAC) control element (CE) transmitted to the UE. In some embodiments, the UE may determine the TTI bundle size implicitly, based on an indicated repetition number (e.g. number of repetitions in an uplink transmission) and frequency hopping number (e.g. the number of frequencies used for the uplink communication) communicated to the UE by the base station.

According to another aspect, frequency hopping for the uplink communications of the UE may be implemented in ways that improve the uplink communications. The UE may report frequency hopping (FH) assist information to the base station for use by the base station to configure FH, for improved uplink communications. FH may be configured in terms of a frequency offset value which may be determined in terms of resource blocks (RBs) that separate two frequency hops. In some embodiments, the frequency offset value may be explicitly reported to the base station by the UE, for example via dedicated higher layer signaling. In some embodiments, a set of frequency offset values may be configured by the base station, and communicated to the UE, e.g. via higher layer signaling. The UE may select a frequency offset value from among the set of frequency hopping values, and provide an indication of the selected frequency offset value to the base station, e.g. via a MAC CE transmitted to the base station. In some embodiments, the UE may report the FH assist information to the base station in an uplink data channel, e.g. in a PUSCH. In such a case, downlink control information—in the physical control channel that schedules transmission of the PUSCH—may include a request for the UE to transmit the FH assist information, which the UE may then transmit to the base station via the PUSCH. Further to mitigate signaling overhead potentially associated with the FH assist reporting, the UE may only report the FH assist information in response to an indication that the UE is allowed to report the FH assist information. The indication may be directly controlled by the base station, for example it may be enabled or disabled by a parameter in the system information block (SIB), or via an information element (IE) transmitted to the UE, e.g. via dedicated higher layer signaling. The indication may further be based on a set of operating conditions being met, based at least in part on a threshold value configured by the base station, whether frequency hopping for the UE is enabled, and/or the value of a newly measured coherence bandwidth at the UE.

According to another aspect, power control for uplink communications that include TTI bundles may be implemented in ways that improve the uplink communications. The same transmission power, also interchangeably referred to as transmit power, may be used for each TTI transmit occasion (or occasion, in short) of the same TTI bundle in order to improve (cross-slot) channel estimation accuracy, and thereby improve uplink communications. In some embodiments, transmission power may be determined for a first transmission occasion of TTI bundle, according at least in part to a power control algorithm, and that transmission power may then be maintained for all other TTI transmissions in the same TTI bundle. In other words, if uplink communications of the UE include TTI bundling (transmission of TTI bundles), the transmission power may be determined on a per TTI bundle basis. Priority rules may be used to determine transmission power allocation in case total transmit power for uplink communications that include TTI bundle(s), e.g. PUSCH/PUCCH transmissions that include TTI bundles, would potentially exceed a specified power limit.

In some embodiments, the uplink communications that include TTI bundles (or TTI bundling operation) may receive highest priority when allocating transmit power. In such cases, the UE may allocate power to uplink transmissions that do not include TTI bundles but overlap with uplink transmissions that do include TTI bundles such that the total transmit power across all serving cells of the UE in a specified frequency range does not exceed the specified power limit, while maintaining the same transmit power for all occasions of the TTI bundle. The UE may also prioritize which channels and/or signals to include in an earlier TTI bundle with respect to other channels and/or signals included in other, overlapping TTI bundles. In some embodiments, in case the transmit power for overlapping occasions of a TTI bundle (i.e. transmit occasions in a TTI bundle that overlap with other uplink transmissions) needs to be reduced or scaled down, the UE may defer the overlapping occasions to the next available (non-overlapping) transmission occasions. In some embodiments, instead of the deferring the overlapping occasions, the UE may skip transmission if a ratio of already transmitted occasions in TTI bundle to the total number of configured occasions of the TTI bundle exceeds a specified threshold. The threshold may be configured by higher layers.

In some embodiments, the UE may decode downlink control information received in a physical control channel prior to a specified point in time, and may detect that the physical control channel triggers (schedules) transmission of an uplink TTI bundle that includes one or more occasion(s) that overlap with other uplink transmission(s) of the UE. The specified point in time may be based at least in part on a transmit time of a first symbol of the scheduled TTI bundle and a time offset value, which may be configured by higher layers. In response to detecting the overlap, the UE may allocate power to transmissions of the TTI bundle occasions and the (overlapping) other uplink transmission(s) such that the total transmission power does not exceed the specified power limit. Furthermore, the UE may not expect by physical control channels transmitted after the specified point in time to include control information that schedules uplink transmissions for the UE.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
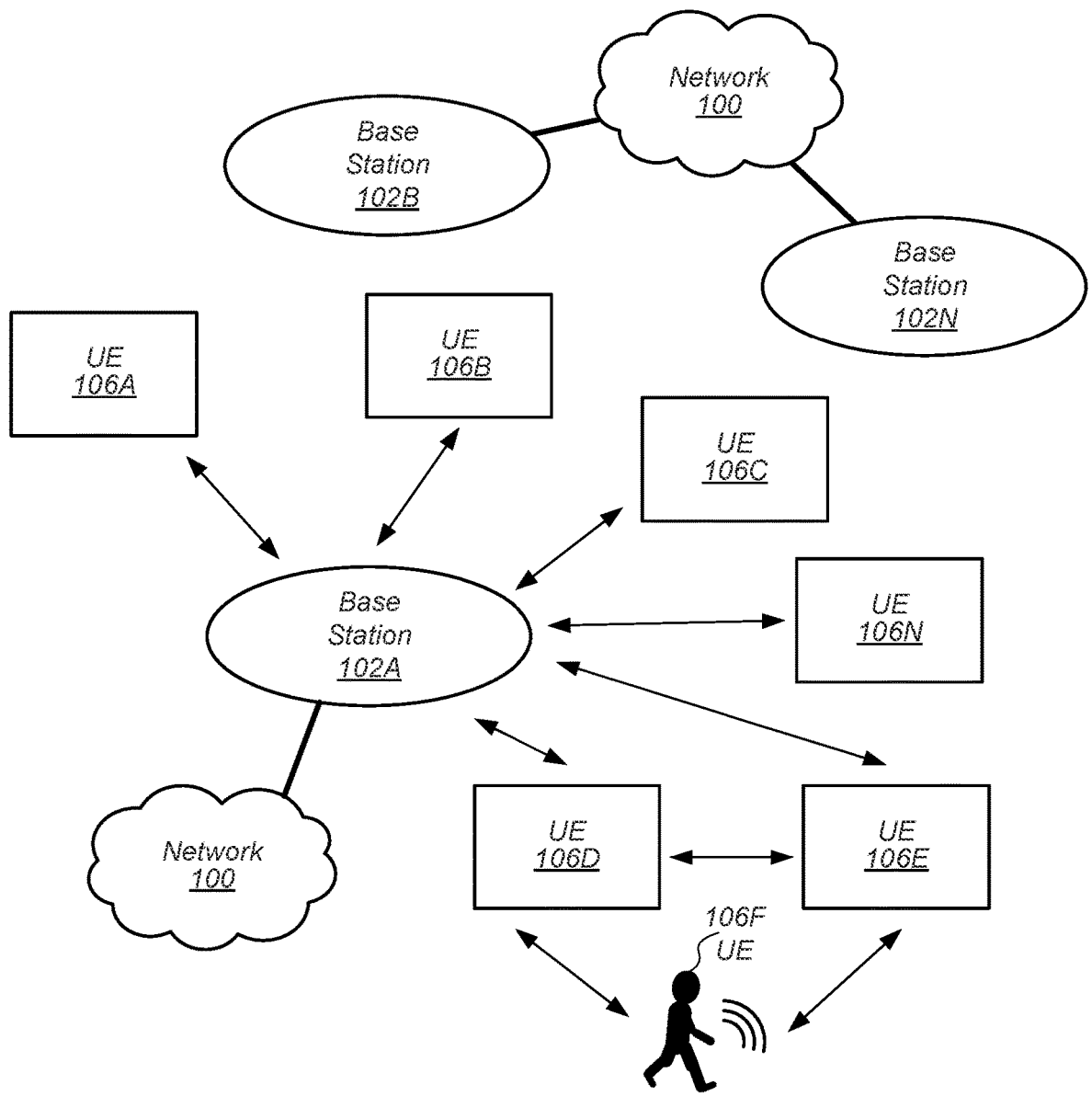
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AF: Application Function
AMF: Access and Mobility Management Function
AMR: Adaptive Multi-Rate
AP: Access Point
APN: Access Point Name
APR: Applications Processor
BS: Base Station
BSSID: Basic Service Set Identifier
CBRS: Citizens Broadband Radio Service
CBSD: Citizens Broadband Radio Service Device
CCA: Clear Channel Assessment
CMR: Change Mode Request
CS: Circuit Switched
DL: Downlink (from BS to UE)
DN: Data Network
DSDS: Dual SIM Dual Standby
DYN: Dynamic
EDCF: Enhanced Distributed Coordination Function
eSNPN: Equivalent Standalone Non-Public Network
FDD: Frequency Division Duplexing
FT: Frame Type
GAA: General Authorized Access
GPRS: General Packet Radio Service
GSM: Global System for Mobile Communication
GTP: GPRS Tunneling Protocol
HPLMN: Home Public Land Mobile Network
IMS: Internet Protocol Multimedia Subsystem
IOT: Internet of Things
IP: Internet Protocol
LAN: Local Area Network
LBT: Listen Before Talk
LQM: Link Quality Metric
LTE: Long Term Evolution
MCC: Mobile Country Code
MNO: Mobile Network Operator
NAS: Non-Access Stratum
NF: Network Function
NG-RAN: Next Generation Radio Access Network
NID: Network Identifier
NMF: Network Identifier Management Function
NPN: Non-Public (cellular) Network
NRF: Network Repository Function
NSI: Network Slice Instance
NSSAI: Network Slice Selection Assistance Information
PAL: Priority Access Licensee
PDCP: Packet Data Convergence Protocol
PDN: Packet Data Network
PDU: Protocol Data Unit
PGW: PDN Gateway
PLMN: Public Land Mobile Network
PSS: Primary Synchronization Signal
PT: Payload Type
QBSS: Quality of Service Enhanced Basic Service Set
QI: Quality Indicator
RA: Registration Accept
RAT: Radio Access Technology
RF: Radio Frequency
ROHC: Robust Header Compression
RR: Registration Request
RTP: Real-time Transport Protocol
RX: Reception/Receive
SAS: Spectrum Allocation Server
SD: Slice Descriptor
SI: System Information
SIB: System Information Block
SID: System Identification Number
SIM: Subscriber Identity Module
SGW: Serving Gateway
SMF: Session Management Function
SNPN: Standalone Non-Public Network
SSS: Secondary Synchronization Signal
SUPI: Subscription Permanent Identifier
TBS: Transport Block Size
TCP: Transmission Control Protocol
TDD: Time Division Duplexing
TX: Transmission/Transmit
UAC: Unified Access Control
UDM: Unified Data Management
UDR: User Data Repository
UE: User Equipment
UI: User Input
UL: Uplink (from UE to BS)
UMTS: Universal Mobile Telecommunication System
UPF: User Plane Function
URM: Universal Resources Management
URSP: UE Route Selection Policy
USIM: User Subscriber Identity Module
Wi-Fi: Wireless Local Area Network (WLAN) RAT based on the Institute of Electrical and Electronics Engineers' (IEEE) 802.11 standards
WLAN: Wireless LAN

Terms

The following is a glossary of terms that may appear in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—Includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, unmanned aerial vehicles (e.g., drones) and unmanned aerial controllers, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. 5G NR, LTE, CDMA, GSM), such as a base station or a cellular telephone, for example.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processor—refers to various elements (e.g. circuits) or combinations of elements that are capable of performing a function in a device, e.g. in a user equipment device or in a cellular network device. Processors may include, for example: general purpose processors and associated memory, portions or circuits of individual processor cores, entire processor cores or processing circuit cores, processing circuit arrays or processor arrays, circuits such as ASICs (Application Specific Integrated Circuits), programmable hardware elements such as a field programmable gate array (FPGA), as well as any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band (or Frequency Band)—The term "band" has the full breadth of its ordinary meaning, and at least includes a section of spectrum (e.g., radio frequency spectrum) in which channels are used or set aside for the same purpose. Furthermore, "frequency band" is used to denote any interval in the frequency domain, delimited by a lower frequency and an upper frequency. The term may refer to a radio band or an interval of some other spectrum. A radio communications signal may occupy a range of frequencies over which (or where) the signal is carried. Such a frequency range is also referred to as the bandwidth of the signal. Thus, bandwidth refers to the difference between the upper frequency and lower frequency in a continuous band of frequencies. A frequency band may represent one communication channel or it may be subdivided into multiple communication channels. Allocation of radio frequency ranges to different uses is a major function of radio spectrum allocation.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Transmission Scheduling—Refers to the scheduling of transmissions, such as wireless transmissions. In some implementations of cellular radio communications, signal and data transmissions may be organized according to designated time units of specific duration during which transmissions take place. As used herein, the term "slot" has the full extent of its ordinary meaning, and at least refers to a smallest (or minimum) scheduling time unit in wireless communications. For example, in 3GPP LTE, transmissions are divided into radio frames, each radio frame being of equal (time) duration (e.g. 10 ms). A radio frame in 3GPP LTE may be further divided into a specified number of (e.g. ten) subframes, each subframe being of equal time duration, with the subframes designated as the smallest (minimum) scheduling unit, or the designated time unit for a transmission. Thus, in a 3GPP LTE example, a "subframe" may be considered an example of a "slot" as defined above. Similarly, a smallest (or minimum) scheduling time unit for 5G NR (or NR, for short) transmissions is referred to as a "slot". In different communication protocols the smallest (or minimum) scheduling time unit may also be named differently.

Resources—The term "resource" has the full extent of its ordinary meaning and may refer to frequency resources and time resources used during wireless communications. As used herein, a resource element (RE) refers to a specific amount or quantity of a resource. For example, in the context of a time resource, a resource element may be a time period of specific length. In the context of a frequency resource, a resource element may be a specific frequency bandwidth, or a specific amount of frequency bandwidth, which may be centered on a specific frequency. As one specific example, a resource element may refer to a resource unit of 1 symbol (in reference to a time resource, e.g. a time period of specific length) per 1 subcarrier (in reference to a frequency resource, e.g. a specific frequency bandwidth, which may be centered on a specific frequency). A resource element group (REG) has the full extent of its ordinary meaning and at least refers to a specified number of consecutive resource elements. In some implementations, a resource element group may not include resource elements reserved for reference signals. A control channel element (CCE) refers to a group of a specified number of consecutive REGs. A resource block (RB) refers to a specified number of resource elements made up of a specified number of subcarriers per specified number of symbols. Each RB may include a specified number of subcarriers. A resource block group (RBG) refers to a unit including multiple RBs. The number of RBs within one RBG may differ depending on the system bandwidth.

Bandwidth Part (BWP)—A carrier bandwidth part (BWP) is a contiguous set of physical resource blocks selected from a contiguous subset of the common resource blocks for a given numerology on a given carrier. For downlink, a UE may be configured with up to a specified number of carrier BWPs (e.g. four BWPs, per some specifications), with one BWP per carrier active at a given time (per some specifications). For uplink, the UE may similarly be configured with up to several (e.g. four) carrier BWPs, with one BWP per carrier active at a given time (per some specifications). If a UE is configured with a supplementary uplink, then the UE may be additionally configured with up to the specified number (e.g. four) carrier BWPs in the supplementary uplink, with one carrier BWP active at a given time (per some specifications).

Multi-cell Arrangements—A Master node is defined as a node (radio access node) that provides control plane connection to the core network in case of multi radio dual connectivity (MR-DC). A master node may be a master eNB (3GPP LTE) or a master gNB (3GPP NR), for example. A secondary node is defined as a radio access node with no control plane connection to the core network, providing additional resources to the UE in case of MR-DC. A Master Cell group (MCG) is defined as a group of serving cells associated with the Master Node, including the primary cell (PCell) and optionally one or more secondary cells (SCell). A Secondary Cell group (SCG) is defined as a group of serving cells associated with the Secondary Node, including a special cell, namely a primary cell of the SCG (PSCell), and optionally including one or more SCells. A UE may typically apply radio link monitoring to the PCell. If the UE is configured with an SCG then the UE may also apply radio link monitoring to the PSCell. Radio link monitoring is generally applied to the active BWPs and the UE is not required to monitor inactive BWPs. The PCell is used to initiate initial access, and the UE may communicate with the PCell and the SCell via Carrier Aggregation (CA). Currently Amended capability means a UE may receive and/or transmit to and/or from multiple cells. The UE initially connects to the PCell, and one or more SCells may be configured for the UE once the UE is in a connected state.

Core Network (CN)—Core network is defined as a part of a 3GPP system which is independent of the connection technology (e.g. the Radio Access Technology, RAT) of the UEs. The UEs may connect to the core network via a radio access network, RAN, which may be RAT-specific.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
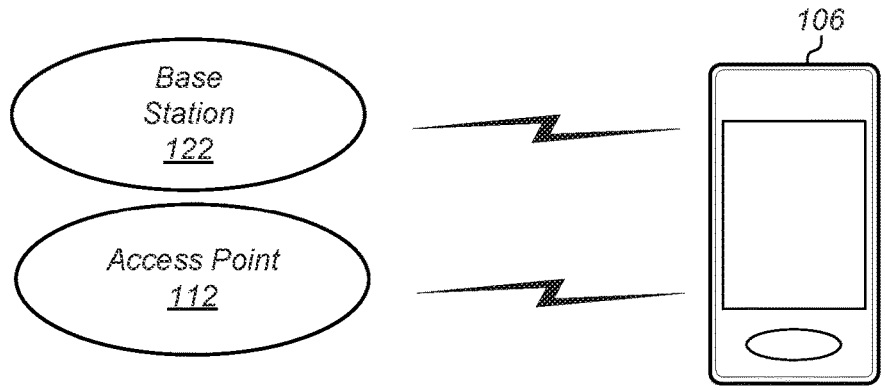
FIG. 2 illustrates an exemplary base station in communication with an exemplary wireless user equipment (UE) device, according to some embodiments.

FIGS. 1 and 2—Exemplary Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes base stations 102A through 102N, also collectively referred to as base station(s) 102 or base station 102. As shown in FIG. 1, base station 102A communicates over a transmission medium with one or more user devices 106A through 106N. Each of the user devices may be referred to herein as a "user equipment" (UE) or UE device. Thus, the user devices 106A through 106N are referred to as UEs or UE devices, and are also collectively referred to as UE(s) 106 or UE 106. Various ones of the UE devices may operate with expanded Physical Uplink Shared Channel (PUSCH) transmission coverage, according to various aspects disclosed herein.

The base station 102A may be a base transceiver station (BTS) or cell site, and may include hardware that enables wireless communication with the UEs 106A through 106N. The base station 102A may also be equipped to communicate with a network 100 (e.g., a core network of a cellular service provider, a telecommunication network such as a public switched telephone network (PSTN), and/or the Internet, neutral host or various CBRS (Citizens Broadband Radio Service) deployments, among various possibilities). Thus, the base station 102A may facilitate communication between the user devices 106 and/or between the user devices 106 and the network 100. In particular, the cellular base station 102A may provide UEs 106 with various telecommunication capabilities, such as voice, short message service (SMS) and/or data services. The communication area (or coverage area) of the base station 106 may be referred to as a "cell." It is noted that "cell" may also refer to a logical identity for a given wireless communication coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network, and may further also be considered at least a part of the UE communicating on the network or over the network.

The base station(s) 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G-NR (NR, for short), 3GPP2 CDMA2000 (e.g., 1×RTT, 1×EV-DO, HRPD, eHRPD), Wi-Fi, WiMAX etc. Note that if the base station 102A is implemented in the context of LTE, it may alternately be referred to as an 'eNodeB' or 'eNB'. Similarly, if the base station 102A is implemented in the context of 5G NR, it may alternately be referred to as 'gNodeB' or 'gNB'. In some embodiments, the base station 102 (e.g. an eNB in an LTE network or a gNB in an NR network) may communicate with at least one UE having the capability to operate with expanded PUSCH transmission coverage according to various aspects disclosed herein. Depending on a given application or specific considerations, for convenience some of the various different RATs may be functionally grouped according to an overall defining characteristic. For example, all cellular RATs may be collectively considered as representative of a first (form/type of) RAT, while Wi-Fi communications may be considered as representative of a second RAT. In other cases, individual cellular RATs may be considered individually as different RATs. For example, when differentiating between cellular communications and Wi-Fi communications, "first RAT" may collectively refer to all cellular RATs under consideration, while "second RAT" may refer to Wi-Fi. Similarly, when applicable, different forms of Wi-Fi communications (e.g. over 2.4 GHz vs. over 5 GHz) may be considered as corresponding to different RATs. Furthermore, cellular communications performed according to a given RAT (e.g. LTE or NR) may be differentiated from each other on the basis of the frequency spectrum in which those communications are conducted. For example, LTE or NR communications may be performed over a primary licensed spectrum as well as over a secondary spectrum such as an unlicensed spectrum and/or spectrum that was assigned to private networks. Overall, the use of various terms and expressions will always be clearly indicated with respect to and within the context of the various applications/embodiments under consideration.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices 106 and/or between the user devices 106 and the network 100. In particular, the cellular base station 102A may provide UEs 106 with various telecommunication capabilities, such as voice, SMS and/or data services. UE 106 may be capable of communicating using multiple wireless communication standards. For example, a UE 106 might be configured to communicate using any or all of a 3GPP cellular communication standard (such as LTE or NR) or a 3GPP2 cellular communication standard (such as a cellular communication standard in the CDMA2000 family of cellular communication standards). Base station 102A and other similar base stations (such as base stations 102B . . . 102N) operating according to the same or a different cellular communication standard may thus be provided as one or more networks of cells, which may provide continuous or nearly continuous overlapping service to UE 106 and similar devices over a wide geographic area via one or more cellular communication standards.

Thus, while base station 102A may act as a "serving cell" for UEs 106A-106N as illustrated in FIG. 1, each one of UE(s) 106 may also be capable of receiving signals from (and may possibly be within communication range of) one or more other cells (possibly provided by base stations 102B-102N and/or any other base stations), which may be referred to as "neighboring cells". Such cells may also be capable of facilitating communication in-between user devices 106 and/or between user devices 106 and the network 100. Such cells may include "macro" cells, "micro" cells, "pico" cells, and/or cells which provide any of various other granularities of service area size. For example, base stations 102A-102B illustrated in FIG. 1 may be macro cells, while base station 102N may be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transmission and reception points (TRPs). In addition, a UE capable of operating according to 5G NR may be connected to one or more TRPs within one or more gNBs.

The UE 106 might also or alternatively be configured to communicate using WLAN, BLUETOOTH™, BLUETOOTH™ Low-Energy, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible. Furthermore, the UE 106 may also communicate with Network 100, through one or more base stations or through other devices, stations, or any appliances not explicitly shown but considered to be part of Network 100. UE 106 communicating with a network may therefore be interpreted as the UE(s) 106 communicating with one or more network nodes considered to be a part of the network and which may interact with the UE(s) 106 to conduct communications with the UE(s) 106 and in some cases affect at least some of the communication parameters and/or use of communication resources of the UE(s) 106.

As also illustrated in FIG. 1, at least some of the UEs, e.g. UEs 106D and 106E may represent vehicles communicating with each other and with base station 102, e.g. via cellular communications such as 3GPP LTE and/or 5G-NR communications, for example. In addition, UE 106F may represent a pedestrian who is communicating and/or interacting in a similar manner with the vehicles represented by UEs 106D and 106E. Various aspects of vehicles communicating in a network exemplified in FIG. 1 are disclosed, for example, in the context of vehicle-to-everything (V2X) communications such as the communications specified by certain versions of the 3GPP standard, among others.

FIG. 2 illustrates an exemplary user equipment 106 (e.g., one of UEs 106A through 106N) in communication with the base station 122 and an access point 112, according to some embodiments. The UE 106 may be a device with both cellular communication capability and non-cellular communication capability (e.g., BLUETOOTH™, Wi-Fi, and so forth) such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards, e.g. those previously mentioned above. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios or radio circuitry which are shared between multiple wireless communication protocols, and one or more radios which are used exclusively by a single wireless communication protocol. For example, the UE 106 may include radio circuitries for communicating using either of LTE or CDMA2000 1×RTT or NR, and separate radios for communicating using each of Wi-Fi and BLUETOOTH™. Other configurations are also possible.

Figure 3:
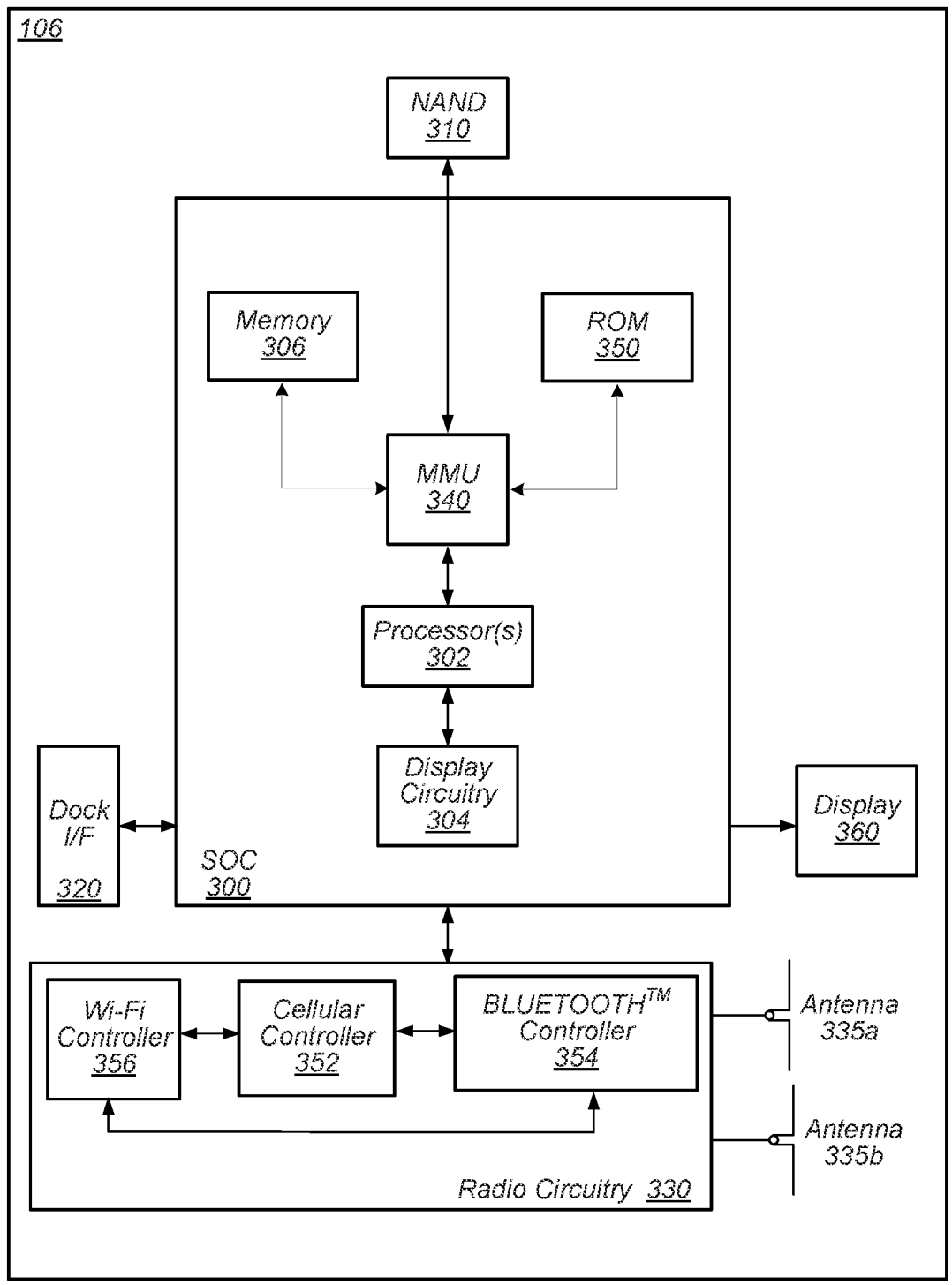
FIG. 3 illustrates an exemplary block diagram of a UE, according to some embodiments.

FIG. 3—Block Diagram of an Exemplary UE

FIG. 3 illustrates a block diagram of an exemplary UE 106, according to some aspects. As shown, the UE 106 may include a system on chip (SOC) 300, which may include various elements/components for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As further described herein, the UE 106 (and/or base station 102) may include hardware and software components for implementing methods for at least UE 106 to operate with expanded PUSCH transmission coverage according to various aspects disclosed herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 with expanded PUSCH transmission coverage according to various aspects disclosed herein. Specifically, processor(s) 302 may be coupled to and/or may interoperate with other components as shown in FIG. 3 to facilitate UE 106 communicating in a manner that seeks to optimize RAT selection. Processor(s) 302 may also implement various other applications and/or end-user applications running on UE 106.

Figure 5:
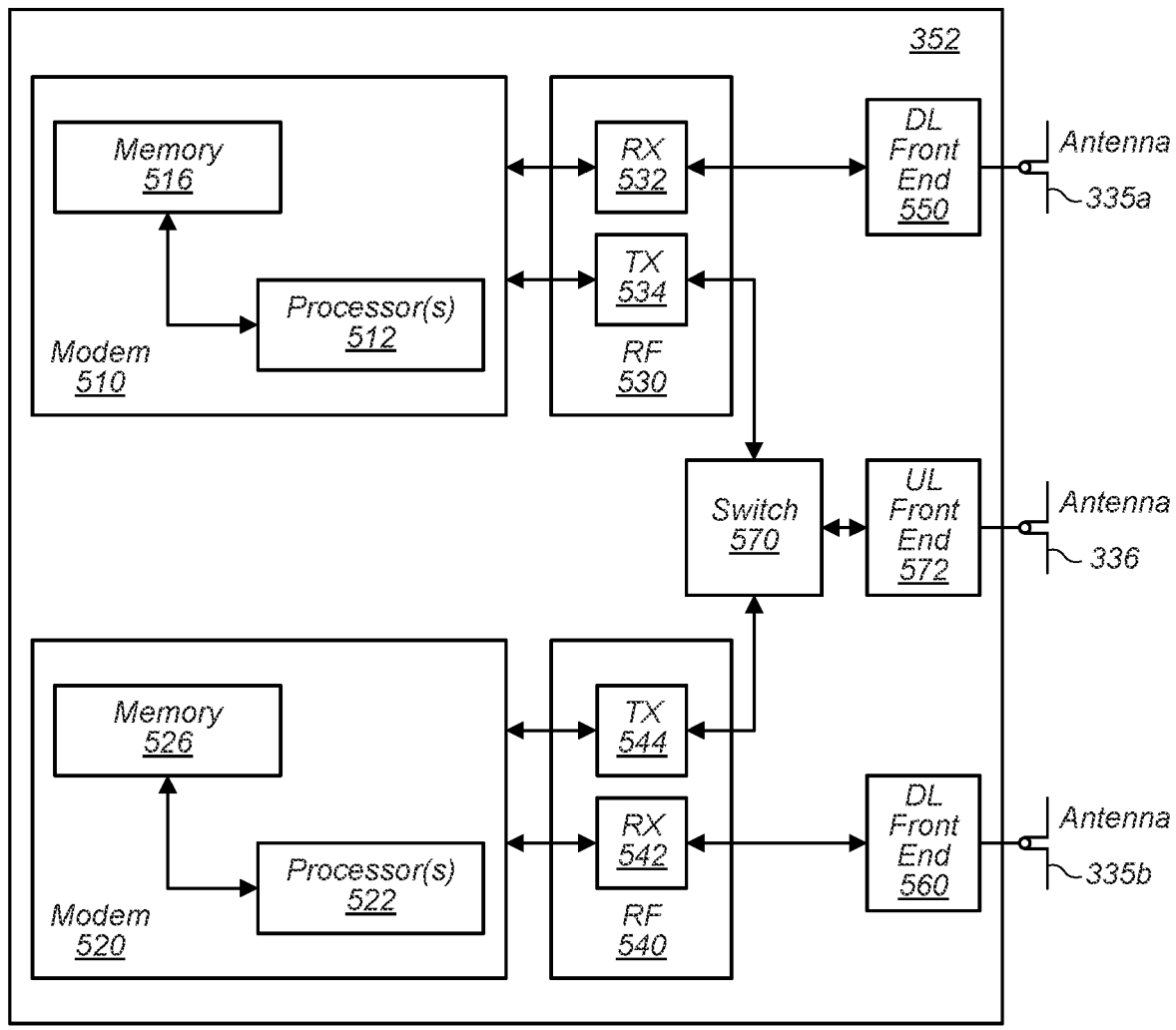
FIG. 5 shows an exemplary simplified block diagram illustrative of cellular communication circuitry, according to some embodiments.

In some embodiments, radio circuitry 330 may include separate controllers dedicated to controlling communications for various respective RATs and/or RAT standards. For example, as shown in FIG. 3, radio circuitry 330 may include a Wi-Fi controller 356, a cellular controller (e.g. LTE and/or NR controller) 352, and BLUETOOTH™ controller 354, and according to at least some aspects, one or more or all of these controllers may be implemented as respective integrated circuits (ICs or chips, for short) in communication with each other and with SOC 300 (e.g. with processor(s) 302). For example, Wi-Fi controller 356 may communicate with cellular controller 352 over a cell-ISM link or WCI interface, and/or BLUETOOTH™ controller 354 may communicate with cellular controller 352 over a cell-ISM link, etc. While three separate controllers are illustrated within radio circuitry 330, other embodiments may have fewer or more similar controllers for various different RATs and/or RAT standards that may be implemented in UE device 106. For example, at least one exemplary block diagram illustrative of some embodiments of cellular controller 352 is shown in FIG. 5 and will be further described below.

Figure 4:
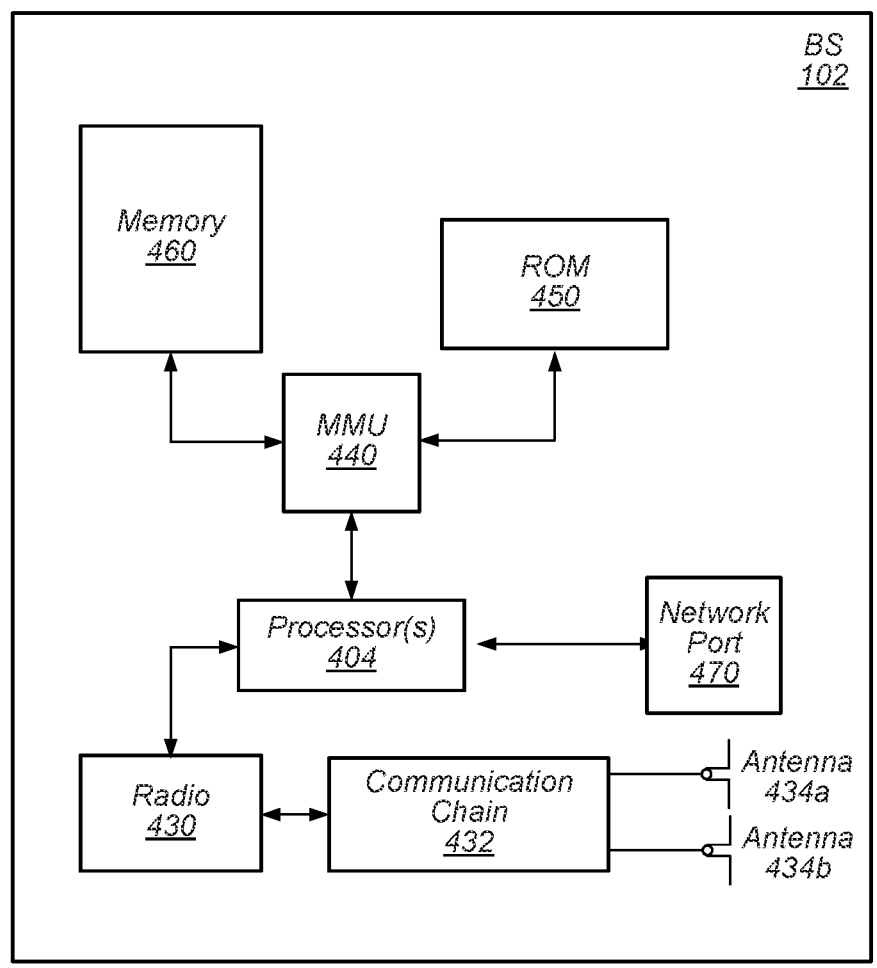
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434a, and possibly multiple antennas (e.g. illustrated by antennas 434a and 434b), for performing wireless communication with mobile devices and/or other devices. Antennas 434a and 434b are shown by way of example, and base station 102 may include fewer or more antennas. Overall, the one or more antennas, which may include antenna 434a and/or antenna 434b, are collectively referred to as antenna 434 or antenna(s) 434. Antenna(s) 434 may be configured to operate as a wireless transceiver and may be further configured to communicate with UE devices 106 via radio circuitry 430. The antenna(s) 434 communicates with the radio 430 via communication chain 432. Communication chain 432 may be a receive chain, a transmit chain or both. The radio circuitry 430 may be designed to communicate via various wireless telecommunication standards, including, but not limited to, LTE, LTE-A, 5G-NR (NR) WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device capable of operating with expanded PUSCH transmission coverage. Alternatively, the processor(s) 404 may be configured as a programmable hardware element(s), such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices that operate with expanded PUSCH transmission coverage according to various embodiments disclosed herein.

FIG. 5—Exemplary Cellular Communication Circuitry

FIG. 5 illustrates an exemplary simplified block diagram illustrative of cellular controller 352, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 352 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 352 may couple (e.g., communicatively; directly or indirectly) to one or more antennas, such as antennas 335a-b and 336 as shown. In some embodiments, cellular communication circuitry 352 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 352 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 352 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 352 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more components. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 352 may include only one transmit/receive chain. For example, the cellular communication circuitry 352 may not include the modem 520, the RF front end 540, the DL front end 560, and/or the antenna 335b. As another example, the cellular communication circuitry 352 may not include the modem 510, the RF front end 530, the DL front end 550, and/or the antenna 335a. In some embodiments, the cellular communication circuitry 352 may also not include the switch 570, and the RF front end 530 or the RF front end 540 may be in communication, e.g., directly, with the UL front end 572.

Physical Uplink Shared Channel (PUSCH) Transmission

3GPP LTE/NR defines a number of downlink (DL) physical channels for downlink communications, categorized as transport or control channels, to carry information blocks received from the MAC and higher layers. 3GPP LTE/NR similarly defines a number of (UL) physical channels for uplink communications. The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information (DCI) message. For example, the DCI may include a transmission configuration indication (TCI) relating to beamforming, with the TCI including configurations such as quasi-co-located (QCL) relationships between the downlink reference signals (DL-RSs) in one Channel State Information RS (CSI-RS) set and the PDSCH Demodulation Reference Signal (DMRS) ports. Each TCI state can contain parameters for configuring a QCL relationship between one or two downlink reference signals and the DMRS ports of the PDSCH, the DMRS port of PDCCH or the CSI-RS port(s) of a CSI-RS resource. Multiple PDCCHs can be transmitted in the same subframe using Control Channel Elements (CCE), each of which is a set of resource elements known as Resource Element Groups (REG). The PDCCH can employ quadrature phase-shift keying (QPSK) modulation, with a specified number (e.g. four) of QPSK symbols mapped to each REG. Furthermore, a specified number (e.g. 1, 2, 4, or 8) of CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the base station (e.g. eNB or gNB). The base station uses the uplink scheduling grant (e.g. in DCI) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

Coverage is one of the key factors that an operator considers when commercializing cellular communication networks due to its direct impact on service quality as well as CAPEX (capital expenses) and OPEX (operating expenses). Despite the importance of coverage for the success of NR commercialization, thorough coverage evaluation and comparison with legacy RATs considering all NR specification details have not been performed up to now. During discussions of the 3GPP NR Standard (specifically, during the RAN #86 meeting), a new study item, 'New SID on NR coverage enhancement' was approved to study potential coverage enhancement solutions for specific scenarios for both FR1 and FR2, targeting different scenarios, such as Urban, rural, indoor, TDD/FDD scenarios with VoIP and eMBB services. During the RAN1 #103 meeting, various observations were made for FR1, based on the outcome of studies based on link-level evaluations. The bottleneck channels were identified as PUSCH (for eMBB and VoIP; indicated as first priority), and PRACH format B4, PUSCH of Msg.3, PUCCH format 1, PUCCH format 3 with 11 bit, PUCCH format 3 with 22 bit. Broadcast PDCCH (indicated as second priority).

Specifically, it was observed based on the link level evaluation results that 0.2~2.1 dB SNR gain for joint channel estimation over multiple slots can be achieved for eMBB (enhanced mobile broadband) at 10% iBLER depending on the number of slots for FR1, compared to Rel-16 PUSCH transmission without joint channel estimation. Accordingly, several issues need to be addressed for TTI-bundling-based joint channel estimation for PUSCH reception. First, there is a need for solutions to determine the bundle granularity in time domain for joint channel estimation especially together with frequency hopping configuration, which could be implicit or explicit. Second, there is a need for mechanisms to assist gNB for frequency hopping configuration with UE-specific information. Finally, there is a need to ensure UE operation that enables phase continuity and power consistency across PUSCH repetitions, especially for carrier aggregation (CA).

According to various aspects disclosed herein, UL Transmission Time Interval (TTI) Bundling, including both Type-A and Type B PUSCH repetitions may be implemented in ways that improve the UL coverage performance.

Uplink TTI Bundle Sizing for Uplink TTI Bundle Transmissions

When TTI bundling across repetitions is turned on or enabled, the UE may be requested to use the same UL precoding vectors across a number of continuous TTIs. The TTI may be a slot (e.g. for Type-A repetition) or a non-slot/mini-slot (e.g. for Type-B repetition). The base station (e.g. gNB) may perform channel estimation and demodulation jointly on the bundled TTIs. The same frequency resources may be maintained for PUSCH repetitions over the bundled TTI, e.g. frequency hopping may be disabled to keep the phase continuity. Signaling from the base station to the UE may indicate whether TTI bundling is enabled. A TTI bundle size or granularity for uplink TTI bundles may be configured for improved uplink communications Bundling granularity may be achieved in different ways.

According to a first approach, a TTI bundling size may be determined by the base station and configured via higher layers (e.g. via dedicated RRC signaling) to the UE. The TTI bundle size may be based on reporting received by the base station from the UE, e.g. in a BSR and/or CSI report.

Figure 6:
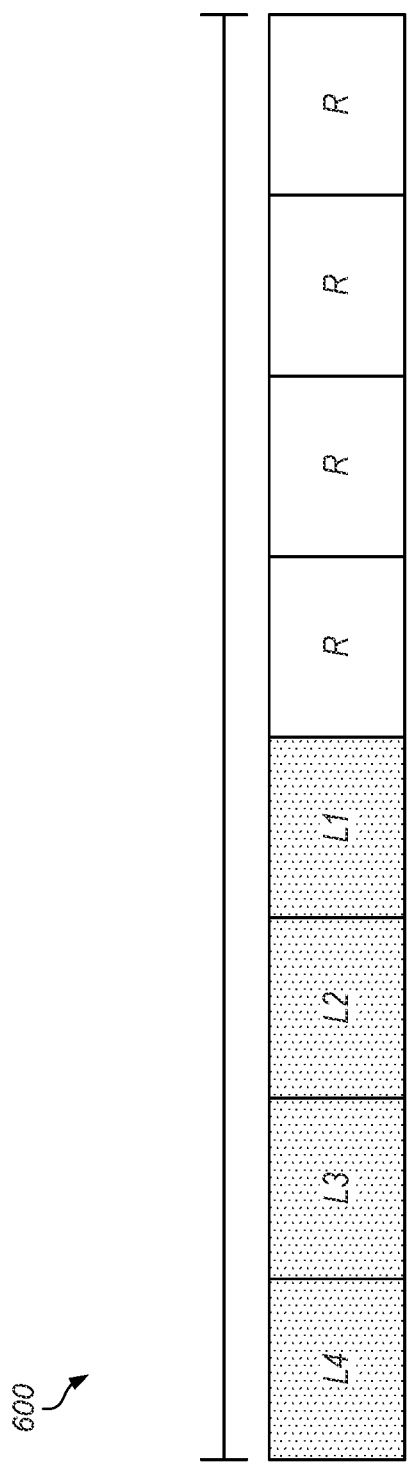
FIG. 6 is a diagram illustrating an exemplary bundling size selection MAC CE of one octet, according to some embodiments.

According to a second approach, a set of TTI bundle sizes may be first determined by the base station and configured for/communicated to the UE via higher layers, e.g. via signaling to the UE. The base station may also provide information to the UE to indicate which TTI bundle size to select from the set. To enable faster bundling size switching, a MAC Control Element (CE) may be introduced to provide the indication information, as depicted in FIG. 6. The TTI bundle size activation selection MAC CE is identified by a MAC sub-header with unique LCID with a fixed size. The "Li" field (e.g. L1, L2, etc.) in FIG. 6 is set to '1' to indicate that the bundling size 'i' configured by RRC signaling is to be selected. The "Li" field is set to '0' to indicate that the bundling size 'i' is not to be selected. Field 'R' denotes the reserved bit, set to '0'. That is, each "Li" field corresponds to a respective TTI bundle size, and the UE may select the appropriate corresponding TTI bundle size (received in the set of TTI bundle sizes) based on the value of the "Li" field.

Figure 7:
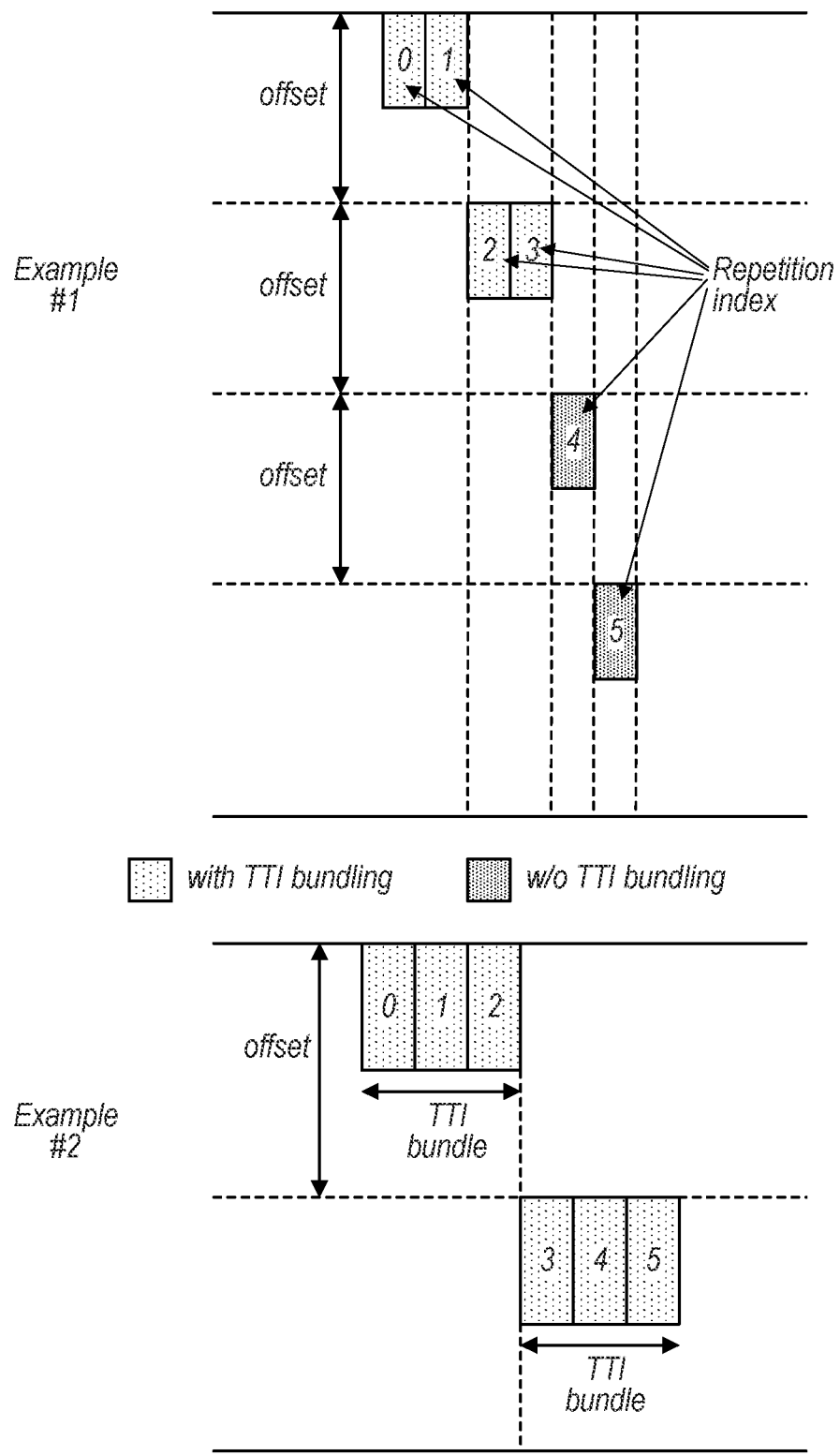
FIG. 7 is a diagram illustrating two examples of TTI bundle size determination based on repetition number and frequency hopping number, according to some embodiments.

According to a third approach, for a given PUSCH repetition, the uplink TTI bundle size may be implicitly determined by the UE based on the indicated repetition number (denoted by 'R' and referring to the number of repetitions used for/during the uplink transmissions) and the number of frequency hopping (FH) (denoted by 'F' and referring to the number of frequencies used for/during the uplink communications) provided to the UE by the base station. An uplink TTI bundle may considered a set of 'k' contiguous TTIs where k=R/F, such that if S=mod(R, F) is not zero, then the size of each of the first S bundles is S, and the bundle size of each of the remaining bundles is the integer quotient of R/F, and if S=0, then the bundle size of each bundle is R/F. Accordingly, the final TTI bundles in an uplink transmission may have fewer than 'k' contiguous TTIs depending on the number of repetitions and frequencies (e.g. depending on the value of [R/F]). FIG. 7 provides examples of TTI bundle size determination based on the repetition number R and frequency number F. In example

1, R and F are set to be '6' and '4' respectively. Correspondingly, the bundle size of the first 'S' bundles is S=mod (R, F)=2. The size of the last bundle is determined to be k=integer quotient of (R/F)=1. In example #2, the value of R is kept as '6', while, the value of F is set to be '2'. Correspondingly, since mod (6, 2)=0, the TTI bundle size for each repetition in this case is simply k=R/F=3.

Measurement-Based Frequency Hopping Configuration

In some aspects, the UE may provide frequency hopping (FH) assist information to the base station for FH configuration, in order to improve uplink communications efficiency. In theory, the RB offset between two frequency hops in a FH operation is supposed to be larger than the fading coherence bandwidth, which is the threshold frequency gap above which two frequency components can be regarded as uncorrelated. For example, for an NR system, the coherence bandwidth may be varied across UEs. It may be desirable and beneficial to make coherence bandwidth measurements on the UE side to assist the base station with setting the FH offset for the uplink transmission (e.g. PUSCH transmission). In Rel-15/16 of the 3GPP standard, the frequency offset between two frequency hops is explicitly configured through RRC signaling by the base station and is provided in terms of RBs (in other words, the FH offset value is provided in terms of RBs). Accordingly, various approaches may be considered to provide assist information to the base station to improve the FH offset configuration in terms of RBs. Different solutions may be considered to enable the measurement-based frequency hopping operation e.g. for a UE operating at the edge of a cell (at a cell-edge).

According to a first approach, the FH assist information may be transmitted by the UE to the base station through dedicated RRC signaling and may explicitly include, e.g. provide, the frequency offset value. As mentioned above, in some designs, the granularity of the frequency offset value may be in units of RB(s).

Figure 8:
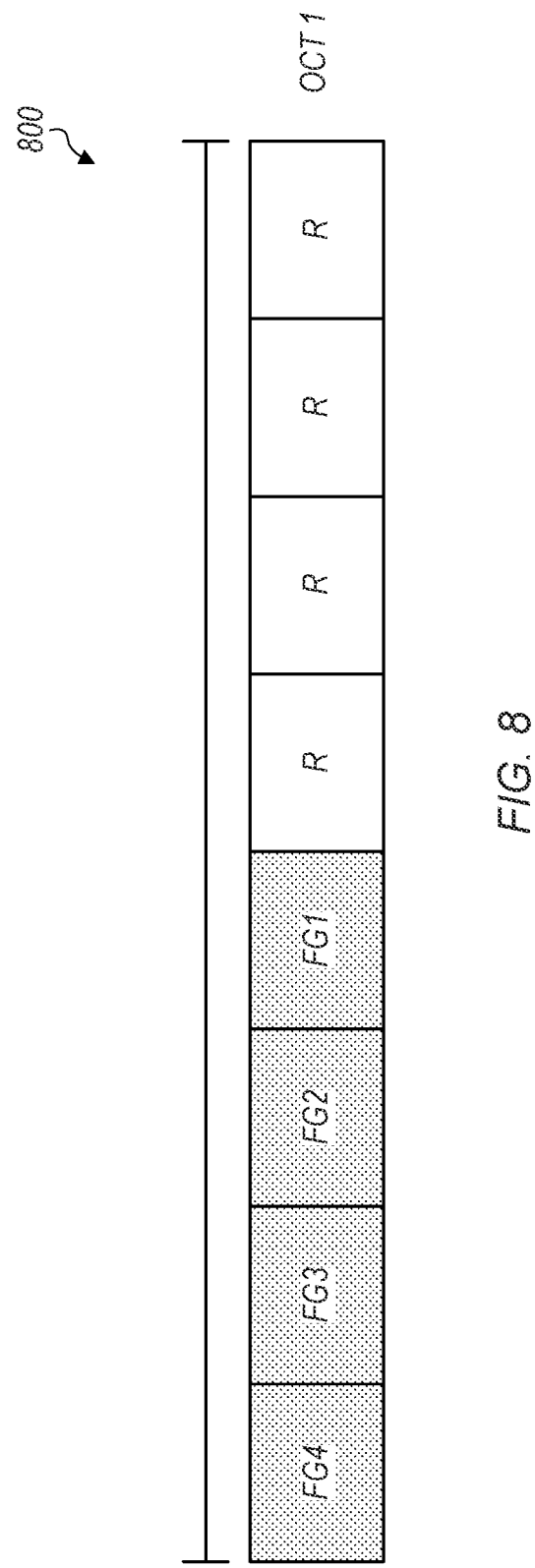
FIG. 8 is diagram illustrating an example of transmitting a Frequency Gap Report (FGR) in a MAC CE to trigger reconfiguration of frequency offset for frequency hopping operation, according to some embodiments.

According to a second approach, in order to enable faster FH assist information reporting, a new MAC CE may be introduced to update the recommended frequency offset values to the base station, as illustrated in FIG. 8. According to this approach, a set of frequency offset values may be configured by the base station and provided to the UE, e.g. via higher layer signaling, such as RRC signaling. The UE may select a preferred frequency offset value from the set of frequency values that was configured by the base station, and may subsequently provide an indication of the preferred frequency offset value to the base station. To enable faster provisioning of this indication, a MAC CE may be used to provide the indication to the base station for the base station to select one of these configured values (e.g. to select the preferred frequency offset value). As shown in FIG. 8, the MAC CE may be a fixed size and may be identified by a MAC sub-header. Similar to the MAC CE used in the case of TTI bundle size determination discussed above, the "FG(i)" field may be set to '1' to indicate that the bundling size corresponding to 'i' as configured by the base station is selected. The FG(i) field may be set to '0' to indicate the that the bundling size corresponding to 'i' is not selected. Field 'R' denotes the reserved bit, set to '0'. That is, each "FG(i)" field corresponds to a respective frequency offset value, and the base station may select the appropriate corresponding frequency offset value based on the value of the "FG(i)" field.

According to a third approach, the FH assist information may be reported by the UE using the PUSCH. To control signaling overhead, an FH assist information request field may be added into the DCI format that schedules (transmission of) the PUSCH. Upon decoding a DCI format in which the FH assist information request field (e.g. 1-bit field) is set to trigger a report, the UE may report the FH assist information in the scheduled PUSCH transmission.

One possible concern with periodic FH assist information reporting may be signaling overhead. To mitigate this issue (e.g. for the first and second approaches described above), enabling of the FH assist information reporting may be controlled by the base station in a variety of different ways, explicitly or implicitly.

According to a first (explicit) option, the FH assist information reporting may be enabled or disabled by a parameter in the system information block, e.g. in SIB1. Alternatively, an information element (IE) may be transmitted via dedicated higher-level signaling, e.g. via RRC signaling to the UE to enable/disable FH assist information reporting by the UE. This enables the base station to control FH assist information reporting on a per UE basis.

According to a second (implicit) option, the FH assist information reporting may be triggered based one or more operating conditions, which may include:
  The measured Reference Signal Received Power (RSRP) at the UE exceeds a threshold value, e.g. a threshold value configured by the base station and provided to the UE in the SIB;
  Frequency hopping is enabled for the UE; and
  The difference between a current FH offset value and a newly measured coherence bandwidth is larger than a specified threshold (e.g. a threshold configured by the base station or a previously specified, e.g. hard-encoded, threshold).

Figure 9:
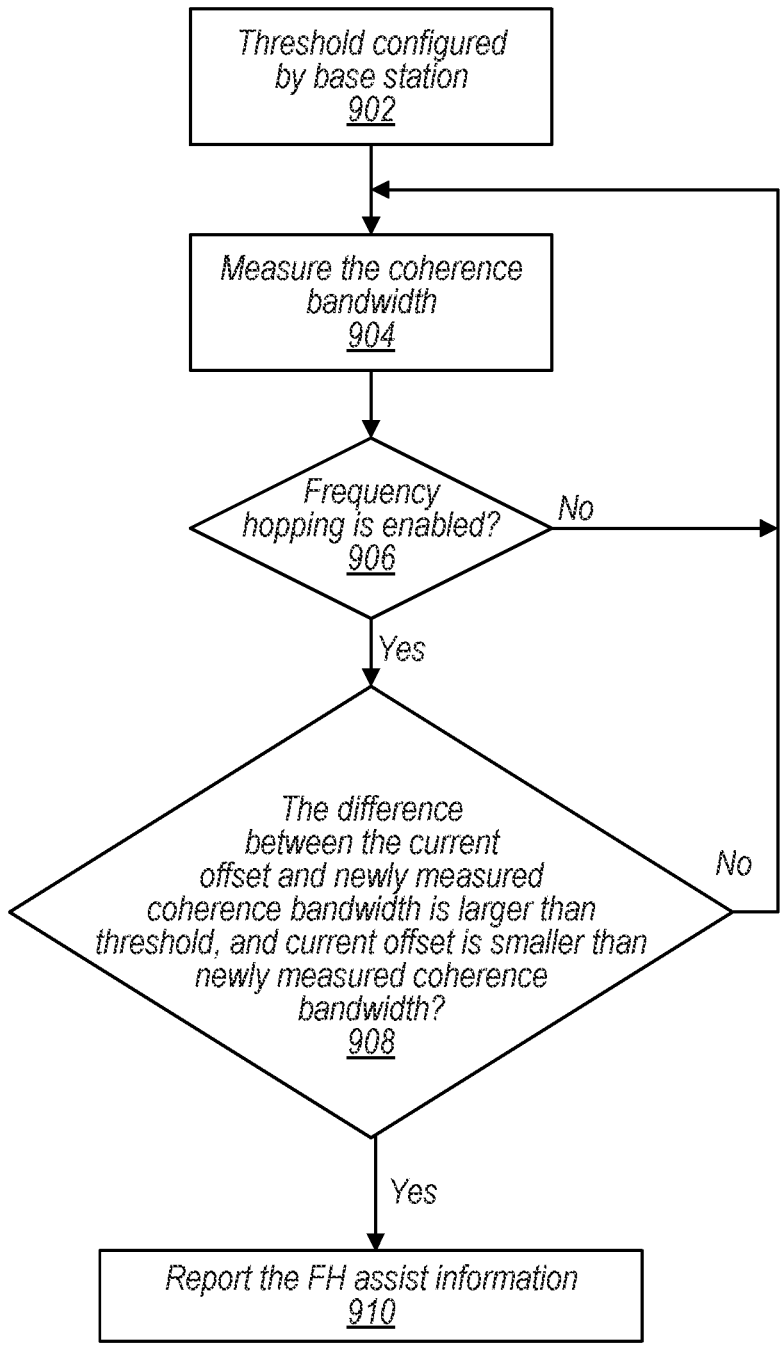
FIG. 9 is a flow diagram illustrating an example of threshold-based FGR reporting to control signaling overhead, according to some embodiments.

The above may minimize the reporting overhead by limiting transmission of the FH assist information by the UE to the base station to certain scenarios or conditions, e.g. to UEs at the cell-edge with frequency hopping. FIG. 9 provides one example of an FH assist information reporting procedure correspond to the second option. As indicated in FIG. 9, the UE only reports FH assist information when FH is enabled, the difference between the present/current offset and newly measured coherence bandwidth (at the UE) is larger than the configured threshold value, and the present/current frequency offset value is smaller than the newly measured coherence bandwidth. As shown in the flow diagram of FIG. 9, a threshold value is configured by the base station (902). The coherence bandwidth at the UE is measured (904). When FH is enabled ('Yes' at 906) and the difference between the current offset and newly measured coherence bandwidth is larger than the threshold, and the current offset is smaller than the newly measured coherence bandwidth ('Yes' at 908), the UE may report the FH assist information. There may be no need to trigger the report when the current offset is greater than the newly measured coherence bandwidth, however the current offset being smaller than the newly measured coherence bandwidth indicates that the current offset configuration is invalid as the FH is within the coherence bandwidth, and hence needs to be reconfigured.

Power Control for TTI-Bundled Transmit Occasions

The transmission power for TTI bundling operation may also be taken into consideration in order to improve uplink communications. In Rel-15/Rel-16 of the 3GPP standard, the transmission power is determined for each transmission occasion in a PUSCH repetition pattern. Consequently, the phase coherency is not kept across consecutive slots on the same antenna ports, and the base station may not be able to perform cross-slot channel estimation even when the same precoding metric is used at the UE side.

In order to improve the channel estimation accuracy, transmission power across all occasions of a TTI bundle may be required to remain the same and constant. The transmission power of a first transmission occasion in a TTI bundle may be determined, e.g. based on a power control algorithm such as the one defined in the existing Rel-15/Rel-16 of the 3GPP standard, and that transmission power may then be maintained for other TTI transmissions in the same TTI bundle. In other words, if the UE is configured with a TTI bundling operation for UL transmission, the transmission power may be determined on a per-TTI-bundle basis.

According to some aspects, if a total UE transmit power for uplink communications that include TTI bundles would exceed a specified power limit (e.g. $P_{CMAX}(i)$) for a respective transmission occasion, priority rules may be established for allocating power to transmissions with TTI bundling to ensure that the transmission power across all occasions of a TTI bundle may remain the same all the while the specified power limit is not exceeded. Prioritizing may be implemented according to a number of different options.

Figure 10:
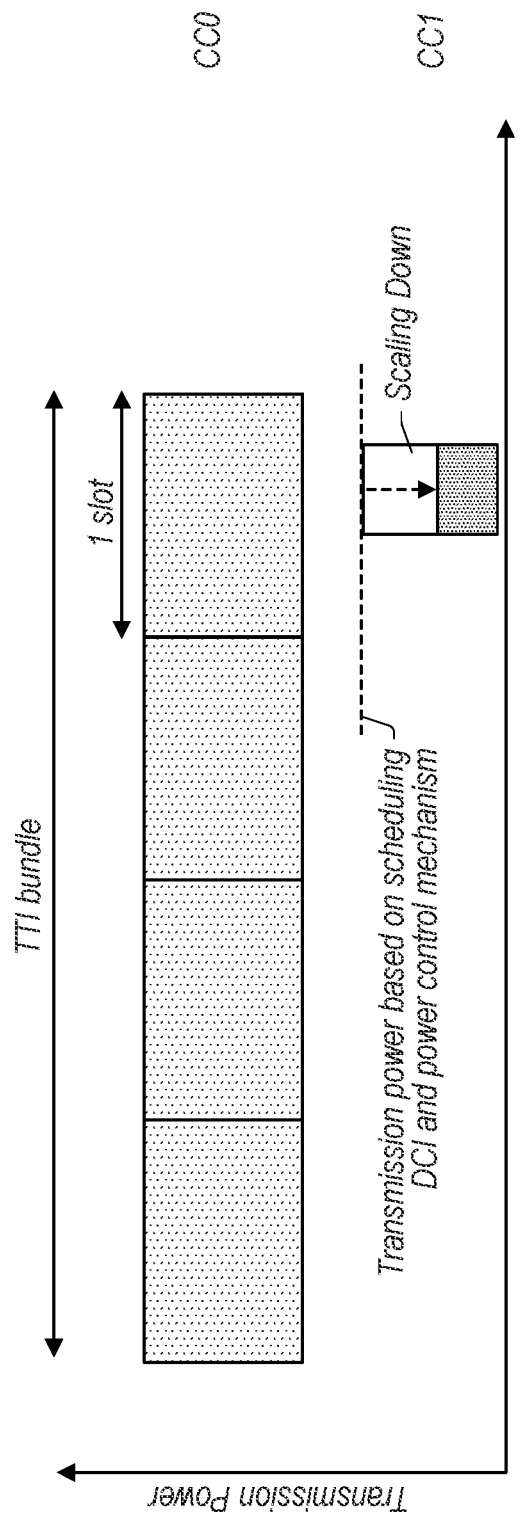
FIG. 10 is a diagram illustrating an example of a power scaling operation that includes limiting power, according to some embodiments.

According to a first option, the uplink transmissions that include TTI bundles, e.g. PUSCH/PUCCH with TTI bundling operation, may always receive highest priority. In such a case, the UE may allocate power to other overlapping uplink (UL) transmissions on other component carriers such that the total UE transmit power for transmission across serving cells in a frequency range does not exceed the specified power limit (e.g. $P_{CMAX}(i)$). In case multiple transmissions with TTI bundles overlap, the earlier TTI bundle transmission may receive higher priority. FIG. 10 provides an illustration of one example of a power scaling operation in a power limited case for the first option. As shown in FIG. 10, the power for the transmission without a TTI bundle on CC1 is scaled down while there is no power scaling for the overlapped transmission on CC0 within the TTI bundle window to maintain the same transmit power for all occasions (slots) of the TTI bundle for joint channel estimation. While this option is simple, it may result in unnecessary performance loss for the uplink transmissions that do not include TTI bundles, e.g. it may result in a dropped HARQ-ACK on CC1.

Figure 11:
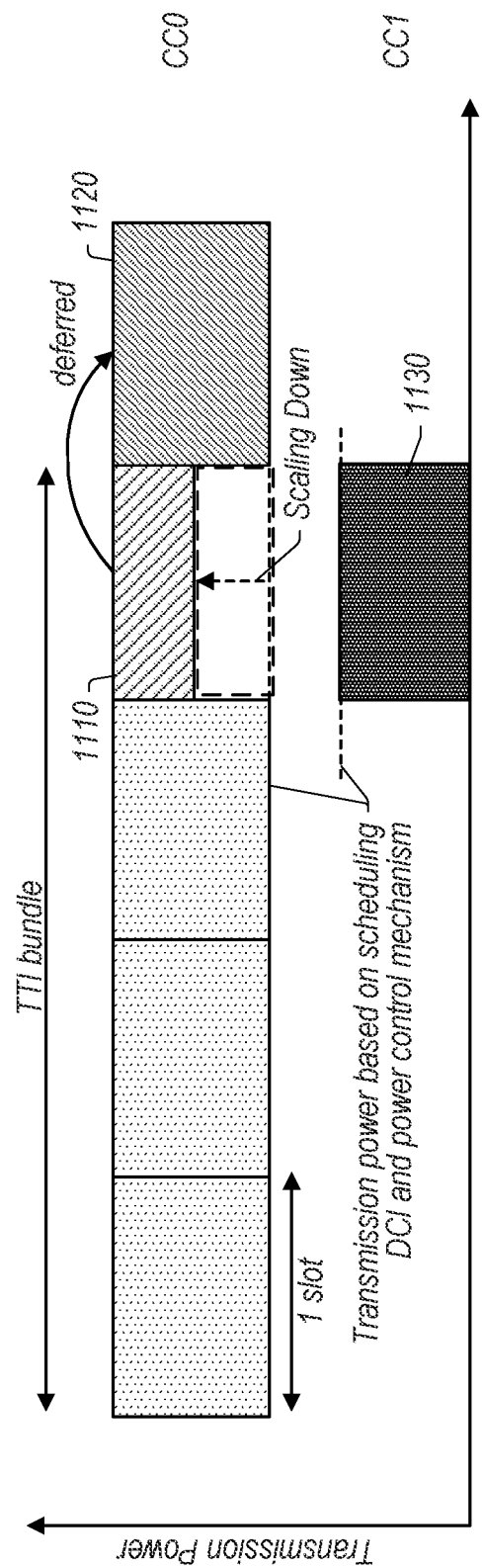
FIG. 11 is a diagram illustrating an example of a power scaling for TTI-bundle-based transmission, according to some embodiments.

According to a second option, in case of power limitation, a prioritization rule, e.g. the prioritization rule defined in Rel-15/16 of the 3GPP standard, may be reused to determine which channels/signal is prioritized for power allocation. For example, the UE may prioritize which channels and/or signals to include in an earlier TTI bundle with respect to which other channels and/or signals to include in other, overlapping TTI bundle(s). Furthermore, if the power allocated to occasion(s) of a TTI bundle that overlap with other uplink transmission occasion(s) would need to be potentially reduced or scaled down due to power constraints, the UE may defer the overlapping TTI bundle occasion(s) to a next available transmission occasion(s), thereby eliminating the need to reduce the power allocation and thus maintaining the same transmission power across all TTI transmission occasions in the TTI bundle. Alternatively, the UE may skip any of the remaining uplink transmissions in the TTI bundle altogether if the ratio of the already conducted transmissions (of the the TTI bundle) to the total configured number of transmissions (of the TTI bundle) is larger than a specified threshold ($X_{Threshold}$). The value of $X_{Threshold}$ may be configured (or provided to the UE) by higher layers, e.g. in SIB information or via dedicated higher layer signaling (e.g. RRC signaling) from the base station. FIG. 11 provides one example illustrating power determination for TTI bundle transmissions corresponding to the second option. As shown in FIG. 11, it is assumed that HARQ-ACK on PUCCH is transmitted on CC1, which is overlapped with PUSCH transmission occasion 1110 within the TTI bundle. More specifically, in case of power limitation for the overlapped transmissions 1110 on CC0 and 1130 on CC1, the transmission occasion 1110 is deferred to occasion 1120 to avoid a power scaling operation. Alternatively, if $X_{Threshold}$ is configured to be 0.6, for example, the UE may simply drop the transmission 1110 without deferring the transmission operation, since the ratio between the transmission and TTI bundle is ¾=75%, which is larger than the $X_{Threshold}$ configured by the base station.

Figure 12:
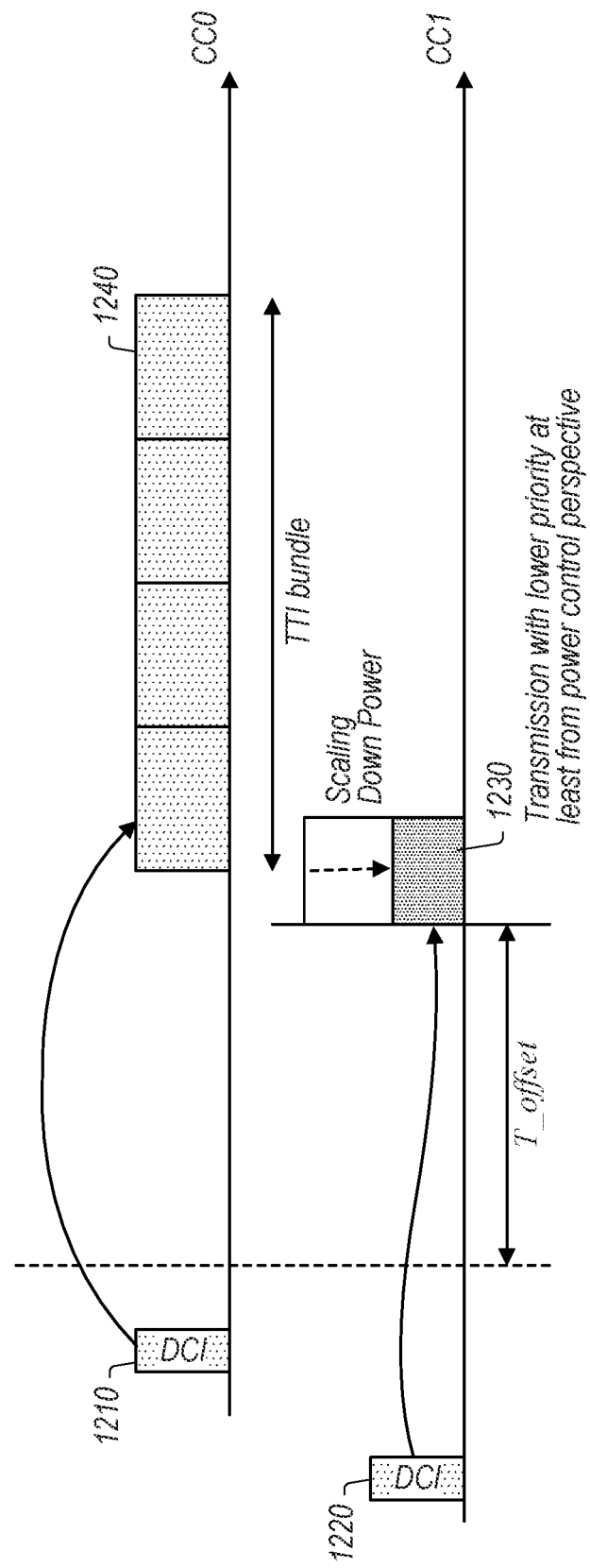
FIG. 12 is a diagram illustrating an example of a window-based power determination for TTI bundling, according to some embodiments.

According to a third option, the UE may decode PDCCH(s) received before a specified point in time [$T_0$-$T_{offset}$], where $T_0$ is the first symbol of a TTI bundle transmission scheduled by the PDDCH and overlapping with other uplink transmission(s) of the UE, and $T_{offset}$ is configured by higher layers. That is, the PDCCH(s) may include downlink control information that triggers or schedules an overlapping transmission with higher priority, it may schedule a TTI-bundled transmission that overlaps with other uplink transmission(s) of the UE. If such PDCCH(s) are detected, e.g. based on the decoding of the PDCCH, the UE may set its transmission power for lower priority transmissions such that the total power for lower priority transmissions is $\leq P_{CMAX}(i)-P_{TTI-bundle}$, where $P_{TTI-bundle}$ is the actual transmission power of transmission occasions within a TTI bundle. Furthermore, the UE does not expect PDCCH (s) received after the point in time defined by [$T_0$-$T_{offset}$] to schedule the UE to transmit physical data channels (PUSCH(s)) that overlap in the time domain with uplink transmissions that include TTI bundles starting at $T_0$. FIG. 12 provides one example of power allocation for option 3. As shown in FIG. 12, the UE may determine the transmission power of overlapped PUSCH transmission 1230 on CC1 based on the detected DCI 1210, which schedules the overlapping TTI-bundle based transmission 1240 on CC0 such that it avoids the power variance in the middle for transmission 1230 on CC1.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method for wireless communications, the method comprising:
receiving, at a base station from a user equipment (UE), information for use by the base station to determine uplink transmit time interval (TTI) bundle sizing information that enables the UE to maintain frequency resources used for a physical uplink channel for an entire TTI bundle transmission of the UE;
determining, by the base station, the uplink TTI bundle sizing information for uplink TTI bundle transmissions of the UE, based at least in part on the received information; and
transmitting to the UE:
the uplink TTI sizing information comprising:
a plurality of bundle sizes; and
bundle size selection information;
a transmission repetition number; and
a number of frequencies used in frequency hopping for the uplink TTI bundle transmissions.

2. The method of claim 1, further comprising transmitting the uplink TTI bundle sizing information to the UE via dedicated higher layer signaling.

3. The method of claim 1, wherein transmitting the plurality of bundle sizes comprises:
transmitting the plurality of bundle sizes via higher layer signaling.

4. A base station comprising:
radio circuitry configured to enable wireless communications of the base station with a user equipment (UE); and
a processor communicatively coupled to the radio circuitry and configured to:
receive, from the UE, information for use by the base station to determine uplink transmit time interval (TTI) bundle sizing information, and
transmit, to the UE:
the uplink TTI bundle sizing information determined by the processor, which uplink TTI bundle sizing information enables the UE to determine and use an uplink TTI bundle size that allows the UE to maintain frequency resources used for a physical uplink channel for an entire TTI bundle transmission;
a transmission repetition number;
a number of frequencies used in frequency hopping for the uplink TTI bundle transmissions; and
a plurality of bundle sizes,
wherein the uplink TTI bundle size is selected by the UE from the plurality of bundle sizes based at least in part on the uplink TTI bundle sizing information, the transmission repetition number, and the number of frequencies.

5. The base station of claim 4, wherein the processor is further configured to transmit the uplink TTI bundle sizing information to the UE via dedicated higher layer signaling.

6. The base station of claim 4, wherein the processor is further configured to:
transmit the plurality of bundle sizes via higher layer signaling; and
transmit the uplink TTI bundle sizing information via a media access control (MAC) control element (CE).

7. A baseband processor of a user equipment (UE), comprising:
an interface configured to receive and provide signals; and
processing circuitry coupled with the interface and configured to:
provide to a base station, information for use by the base station to determine uplink transmit time interval (TTI) bundle sizing information;
subsequent to providing the information to the base station receive, via the interface from the base station, the uplink TTI bundle sizing information that enables the UE to maintain frequency resources used for a physical uplink channel for an entire TTI bundle transmission of the UE;
receive from the base station:
a set of bundle sizes;
a transmission repetition number; and
a number of frequencies used in frequency hopping for the uplink TTI bundle transmissions; and
provide to the base station, an uplink TTI bundle size for uplink TTI bundle transmissions of the UE, based at least in part on the received uplink TTI bundle sizing information, the set of bundle sizes, the transmission repetition number, and the number of frequencies.

8. The baseband processor of claim 7, wherein the processing circuitry is further configured to enable reception, via dedicated higher layer signaling, of the uplink TTI bundle sizing information.

9. The baseband processor of claim 7, wherein the processing circuitry is further configured to enable reception at the interface including:
enabling reception, via higher layer signaling, of the set of bundle sizes at the interface; and
enabling reception, via a media access control (MAC) control element (CE), of the uplink TTI bundle sizing information at the interface.

10. The baseband processor of claim 7, wherein the processing circuitry is further configured to:
cause transmission, to the base station, of frequency hopping (FH) assist information for use by the base station to provide a frequency offset value for configuring FH for uplink communications of the UE; and
cause the uplink communications of the UE to be conducted according to at least the FH configured by the base station based on the FH assist information.

11. The baseband processor of claim 10, wherein the frequency offset value is defined in terms of resource block (RB) units.

12. The baseband processor of claim 10, wherein the FH assist information provides the frequency offset value to the base station.

13. The baseband processor of claim 10, wherein the processing circuitry is further configured to:
- enable reception, from the base station, of a set of frequency offset values;
- select the frequency offset value from among the set of frequency offset values; and
- provide the frequency offset value in the FH assist information.

* * * * *